(12) United States Patent
Harinath et al.

(10) Patent No.: US 8,071,037 B2
(45) Date of Patent: Dec. 6, 2011

(54) CATALYTIC DEVICES FOR CONVERTING UREA TO AMMONIA

(75) Inventors: Arvind V. Harinath, Columbus, IN (US); Bryan E. Blackwell, Franklin, IN (US); Pradeep Prasad, Columbus, IN (US); Z. Gerald Liu, Madison, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 737 days.

(21) Appl. No.: 12/145,618

(22) Filed: Jun. 25, 2008

(65) Prior Publication Data
US 2009/0324453 A1 Dec. 31, 2009

(51) Int. Cl.
*B01D 50/00* (2006.01)
*F01N 5/00* (2006.01)
*B21D 51/16* (2006.01)

(52) U.S. Cl. ............ 422/177; 422/180; 60/286; 60/300; 29/890

(58) Field of Classification Search ............ 422/171, 422/177, 180; 60/286, 300; 29/890
See application file for complete search history.

(56) References Cited

U.S. PATENT DOCUMENTS

| | | |
|---|---|---|
| 3,656,915 A | 4/1972 | Tourtellotte |
| 4,684,393 A | 8/1987 | Shapiro |
| 4,723,988 A | 2/1988 | Shapiro |
| 4,929,586 A | 5/1990 | Hegedus et al. |
| 5,281,403 A | 1/1994 | Jones |
| 5,300,270 A | 4/1994 | Krigmont et al. |
| 5,308,810 A | 5/1994 | Voss et al. |
| 5,310,714 A | 5/1994 | Grasselli et al. |
| 5,316,661 A | 5/1994 | Dessau et al. |
| 5,370,849 A | 12/1994 | Chang |
| 5,374,410 A | 12/1994 | Grasselli et al. |
| 5,441,713 A | 8/1995 | Dubin et al. |
| 5,540,047 A | 7/1996 | Dahlheim et al. |
| 5,546,004 A | 8/1996 | Schmelz |
| 5,547,650 A | 8/1996 | Edgar et al. |
| 5,601,792 A | 2/1997 | Hug et al. |
| 5,645,756 A | 7/1997 | Dubin et al. |
| 5,658,545 A | 8/1997 | Chang et al. |
| 5,711,147 A | 1/1998 | Vogtlin et al. |
| 5,783,428 A | 7/1998 | Goto et al. |
| 5,809,774 A | 9/1998 | Peter-Hoblyn et al. |
| 5,827,490 A | 10/1998 | Jones |
| 5,849,818 A | 12/1998 | Walles et al. |

(Continued)

FOREIGN PATENT DOCUMENTS
EP 1481719 * 12/2004
(Continued)

OTHER PUBLICATIONS

International Preliminary Report on Patentability for corresponding application PCT/US09/040831, having a mailing date of Jan. 13, 2011.

(Continued)

*Primary Examiner* — Nina Bhat
(74) *Attorney, Agent, or Firm* — Andrus, Sceales, Starke & Sawall, LLP (57) ABSTRACT

Described are apparatuses, systems, and methods for treating exhaust. The described apparatus and systems typically include a catalytic device for converting aqueous urea to ammonia. The catalytic device may include a pyrolysis catalyst and a hydrolysis catalyst for converting aqueous urea to ammonia. The catalytic device typically includes an upstream face that is positioned at an angle relative to exhaust flow when the device is positioned in a selective catalytic reduction (SCR) system.

18 Claims, 4 Drawing Sheets

U.S. PATENT DOCUMENTS

| | | | |
|---|---|---|---|
| 5,886,177 A | 3/1999 | Cook et al. | |
| 5,891,409 A | 4/1999 | Hsiao et al. | |
| 5,893,267 A | 4/1999 | Vogtlin et al. | |
| 6,001,922 A | 12/1999 | Clark et al. | |
| 6,038,854 A | 3/2000 | Penetrante et al. | |
| 6,093,380 A | 7/2000 | Lagana et al. | |
| 6,120,580 A | 9/2000 | Sandler | |
| 6,182,443 B1 | 2/2001 | Jarvis et al. | |
| 6,187,797 B1 | 2/2001 | Pruitt et al. | |
| 6,197,268 B1 | 3/2001 | Hwang et al. | |
| 6,203,770 B1* | 3/2001 | Peter-Hoblyn et al. | 423/212 |
| 6,214,195 B1 | 4/2001 | Yadav et al. | |
| 6,245,134 B1 | 6/2001 | Sandler | |
| 6,264,905 B1 | 7/2001 | Spokoyny | |
| 6,267,864 B1 | 7/2001 | Yadav et al. | |
| 6,282,371 B1 | 8/2001 | Martin et al. | |
| 6,311,484 B1 | 11/2001 | Roth et al. | |
| 6,314,722 B1 | 11/2001 | Matros et al. | |
| 6,361,754 B1 | 3/2002 | Peter-Hoblyn et al. | |
| 6,403,620 B1 | 6/2002 | Galemmo, Jr. et al. | |
| 6,444,006 B1 | 9/2002 | Haberkamp et al. | |
| 6,446,430 B1 | 9/2002 | Roth et al. | |
| 6,449,947 B1* | 9/2002 | Liu et al. | 60/286 |
| 6,455,463 B1 | 9/2002 | Labarge et al. | |
| 6,468,489 B1 | 10/2002 | Chang et al. | |
| 6,475,453 B1 | 11/2002 | Mathes et al. | |
| 6,514,742 B1 | 2/2003 | Mitsuhashi et al. | |
| 6,517,702 B2 | 2/2003 | Stahl | |
| 6,531,704 B2 | 3/2003 | Yadav et al. | |
| 6,534,022 B1 | 3/2003 | Carlborg et al. | |
| 6,548,512 B1 | 4/2003 | Pinto et al. | |
| 6,569,874 B1 | 5/2003 | Pruitt et al. | |
| 6,581,684 B2 | 6/2003 | Wellington et al. | |
| 6,582,490 B2 | 6/2003 | Miller et al. | |
| 6,588,503 B2 | 7/2003 | Karanikas et al. | |
| 6,588,504 B2 | 7/2003 | Wellington et al. | |
| 6,591,906 B2 | 7/2003 | Wellington et al. | |
| 6,591,907 B2 | 7/2003 | Zhang et al. | |
| 6,601,385 B2* | 8/2003 | Verdegan et al. | 60/286 |
| 6,602,895 B2 | 8/2003 | Galemmo, Jr. et al. | |
| 6,607,033 B2 | 8/2003 | Wellington et al. | |
| 6,609,570 B2 | 8/2003 | Wellington et al. | |
| 6,616,901 B1 | 9/2003 | Lagana et al. | |
| 6,620,393 B2 | 9/2003 | Spokoyny | |
| 6,624,113 B2 | 9/2003 | Labarge et al. | |
| 6,649,347 B2 | 11/2003 | Luo et al. | |
| 6,670,296 B2 | 12/2003 | Labarge et al. | |
| 6,688,387 B1 | 2/2004 | Wellington et al. | |
| 6,698,515 B2 | 3/2004 | Karanikas et al. | |
| 6,702,016 B2 | 3/2004 | de Rouffignac et al. | |
| 6,708,758 B2 | 3/2004 | de Rouffignac et al. | |
| 6,712,135 B2 | 3/2004 | Wellington et al. | |
| 6,712,136 B2 | 3/2004 | de Rouffignac et al. | |
| 6,712,137 B2 | 3/2004 | Vinegar et al. | |
| 6,712,869 B2 | 3/2004 | Cheng et al. | |
| 6,713,030 B1 | 3/2004 | Chandler et al. | |
| 6,715,546 B2 | 4/2004 | Vinegar et al. | |
| 6,715,547 B2 | 4/2004 | Vinegar et al. | |
| 6,715,548 B2 | 4/2004 | Wellington et al. | |
| 6,715,549 B2 | 4/2004 | Wellington et al. | |
| 6,719,047 B2 | 4/2004 | Fowler et al. | |
| 6,722,123 B2 | 4/2004 | Liu et al. | |
| 6,722,429 B2 | 4/2004 | de Rouffignac et al. | |
| 6,722,430 B2 | 4/2004 | Vinegar et al. | |
| 6,722,431 B2 | 4/2004 | Karanikas et al. | |
| 6,725,920 B2 | 4/2004 | Zhang et al. | |
| 6,725,921 B2 | 4/2004 | de Rouffignac et al. | |
| 6,725,928 B2 | 4/2004 | Vinegar et al. | |
| 6,729,395 B2 | 5/2004 | Shahin, Jr. et al. | |
| 6,729,396 B2 | 5/2004 | Vinegar et al. | |
| 6,729,397 B2 | 5/2004 | Zhang et al. | |
| 6,729,401 B2 | 5/2004 | Vinegar et al. | |
| 6,732,794 B2 | 5/2004 | Wellington et al. | |
| 6,732,795 B2 | 5/2004 | de Rouffignac et al. | |
| 6,732,796 B2 | 5/2004 | Vinegar et al. | |
| 6,736,215 B2 | 5/2004 | Maher et al. | |
| 6,739,393 B2 | 5/2004 | Vinegar et al. | |
| 6,739,394 B2 | 5/2004 | Vinegar et al. | |
| 6,742,587 B2 | 6/2004 | Vinegar et al. | |
| 6,742,588 B2 | 6/2004 | Wellington et al. | |
| 6,742,589 B2 | 6/2004 | Berchenko et al. | |
| 6,742,593 B2 | 6/2004 | Vinegar et al. | |
| 6,745,831 B2 | 6/2004 | de Rouffignac et al. | |
| 6,745,832 B2 | 6/2004 | Wellington et al. | |
| 6,745,837 B2 | 6/2004 | Wellington et al. | |
| 6,749,021 B2 | 6/2004 | Vinegar et al. | |
| 6,752,210 B2 | 6/2004 | de Rouffignac et al. | |
| 6,758,268 B2 | 7/2004 | Vinegar et al. | |
| 6,761,216 B2 | 7/2004 | Vinegar et al. | |
| 6,763,886 B2 | 7/2004 | Schoeling et al. | |
| 6,769,483 B2 | 8/2004 | de Rouffignac et al. | |
| 6,769,485 B2 | 8/2004 | Vinegar et al. | |
| 6,782,947 B2 | 8/2004 | de Rouffignac et al. | |
| 6,789,625 B2 | 9/2004 | de Rouffignac et al. | |
| 6,805,195 B2 | 10/2004 | Vinegar et al. | |
| 6,820,688 B2 | 11/2004 | Vinegar et al. | |
| 6,826,906 B2 | 12/2004 | Kakwani et al. | |
| 6,833,272 B1 | 12/2004 | Binder et al. | |
| 6,835,689 B1 | 12/2004 | He et al. | |
| 6,855,303 B1 | 2/2005 | Mowery-Evans et al. | |
| 6,863,874 B1 | 3/2005 | Twigg | |
| 6,864,213 B2 | 3/2005 | LaBarge et al. | |
| 6,866,097 B2 | 3/2005 | Vinegar et al. | |
| 6,871,707 B2 | 3/2005 | Karanikas et al. | |
| 6,877,554 B2 | 4/2005 | Stegemeier et al. | |
| 6,877,555 B2 | 4/2005 | Karanikas et al. | |
| 6,880,633 B2 | 4/2005 | Wellington et al. | |
| 6,880,635 B2 | 4/2005 | Vinegar et al. | |
| 6,888,116 B2 | 5/2005 | Dalton et al. | |
| 6,891,138 B2 | 5/2005 | Dalton | |
| 6,904,752 B2 | 6/2005 | Foster et al. | |
| 6,905,861 B2 | 6/2005 | Mitsuhashi et al. | |
| 6,919,047 B1* | 7/2005 | He et al. | 422/122 |
| 6,928,807 B2 | 8/2005 | Jacob et al. | |
| 6,946,013 B2 | 9/2005 | Alward et al. | |
| 6,946,107 B2 | 9/2005 | Carlborg et al. | |
| 6,972,197 B1 | 12/2005 | Preuss et al. | |
| 6,973,967 B2 | 12/2005 | Stegemeier et al. | |
| 6,979,430 B2 | 12/2005 | Fan et al. | |
| 6,981,548 B2 | 1/2006 | Wellington et al. | |
| 6,991,031 B2 | 1/2006 | Vinegar et al. | |
| 6,991,032 B2 | 1/2006 | Berchenko et al. | |
| 6,991,033 B2 | 1/2006 | Berchenko et al. | |
| 6,991,036 B2 | 1/2006 | Sumnu-Dindoruk et al. | |
| 6,991,045 B2 | 1/2006 | Vinegar et al. | |
| 6,994,160 B2 | 2/2006 | Wellington et al. | |
| 6,994,161 B2 | 2/2006 | Maher et al. | |
| 6,994,168 B2 | 2/2006 | Wellington et al. | |
| 6,996,975 B2 | 2/2006 | Radhamohan et al. | |
| 6,997,255 B2 | 2/2006 | Wellington et al. | |
| 7,004,247 B2 | 2/2006 | Cole et al. | |
| 7,004,251 B2 | 2/2006 | Ward et al. | |
| 7,011,154 B2 | 3/2006 | Maher et al. | |
| 7,013,972 B2 | 3/2006 | Vinegar et al. | |
| 7,017,389 B2 | 3/2006 | Gouma | |
| 7,017,661 B2 | 3/2006 | Vinegar et al. | |
| 7,032,660 B2 | 4/2006 | Vinegar et al. | |
| 7,036,583 B2 | 5/2006 | de Rouffignac et al. | |
| 7,040,084 B2 | 5/2006 | Ament | |
| 7,040,397 B2 | 5/2006 | de Rouffignac et al. | |
| 7,040,398 B2 | 5/2006 | Wellington et al. | |
| 7,040,399 B2 | 5/2006 | Wellington et al. | |
| 7,040,400 B2 | 5/2006 | de Rouffignac et al. | |
| 7,051,807 B2 | 5/2006 | Vinegar et al. | |
| 7,051,808 B1 | 5/2006 | Vinegar et al. | |
| 7,051,811 B2 | 5/2006 | de Rouffignac et al. | |
| 7,052,532 B1 | 5/2006 | Liu et al. | |
| 7,055,600 B2 | 6/2006 | Messier et al. | |
| 7,060,444 B1 | 6/2006 | McCabe et al. | |
| 7,060,458 B1 | 6/2006 | Doucette-Stamm et al. | |

| | | |
|---|---|---|
| 7,065,958 B2 * | 6/2006 | Funk et al. ............. 60/286 |
| 7,127,884 B2 | 10/2006 | Wörner et al. |
| 7,240,484 B2 | 7/2007 | Li et al. |
| 7,328,572 B2 * | 2/2008 | McKinley et al. ......... 60/286 |
| 7,533,522 B2 * | 5/2009 | Klein ................... 60/286 |
| 7,814,745 B2 * | 10/2010 | Levin et al. ............. 60/286 |
| 2006/0115402 A1 | 6/2006 | Sun et al. |
| 2007/0051097 A1 | 3/2007 | Klein |
| 2008/0041040 A1 | 2/2008 | During |
| 2009/0151334 A1 * | 6/2009 | Kim .................... 60/286 |

FOREIGN PATENT DOCUMENTS

WO    WO-97/36676    10/1997

OTHER PUBLICATIONS

International Search Report and Written Opinion for corresponding application PCT/US09/040831, having a mailing date of Jun. 9, 2009.

* cited by examiner

CATALYTIC DEVICES FOR CONVERTING UREA TO AMMONIA

BACKGROUND

The field of the invention relates to exhaust aftertreatment devices for internal combustion engines. In particular, the field of the invention relates to selective catalytic reduction (SCR) systems for internal combustion engine exhaust including those suitable for use in industrial processes and in mobile and stationary diesel, natural gas, and other engine applications.

Exhaust from internal combustions engines typically includes oxidized nitrogen gases such as nitrogen oxide (NO), nitrogen dioxide ($NO_2$), and nitrous oxide ($N_2O$), which collectively are referred to as "$NO_x$." Because $NO_x$ can be an environmental hazard, systems have been developed to remove $NO_x$ from exhaust by selective catalytic reduction (SCR).

Selective catalytic reduction (SCR) of nitrogen oxides ($NO_x$) using a reducing agent is known in industrial processes as well as in stationary diesel engine applications. Ammonia is a commonly used reducing agent in SCR systems. $NO_x$ reacts with ammonia and is catalytically reduced by a SCR to nitrogen gas ($N_2$) with water as a by-product. This reaction may be represented generally as follows:

$NO_x + NH_3 \rightarrow N_2 + H_2O$

This reaction may be catalyzed by catalysts referred to as "SCR catalysts."

Because ammonia is a hazardous substance, typically ammonia is not directly introduced into SCR systems. Rather, ammonia is generated in situ by introducing a less hazardous, ammonia-generating source into the SCR system. One common ammonia-generating source is aqueous urea. In the SCR system, aqueous urea is injected into the exhaust gas flow stream upstream of the SCR. Water in the droplets from the injection solution evaporate leaving urea, which decomposes in heat (i.e., pyrolyzes) to isocyanic acid and ammonia. In water, isocyanic acid then hydrolyzes to create ammonia and carbon dioxide. These reactions may be represented generally as follows:

$CO(NH_2)_2 + heat \rightarrow HNCO + NH_3$ $HNCO + H_2O \rightarrow NH_3 + CO_2$ These reactions may be catalyzed by catalysts referred to as "pyrolysis catalysts" and "hydrolysis catalysts," respectively. The ammonia thus formed may react and reduce $NO_x$ in a SCR reaction.

The use of SCR catalysts for mobile applications is problematic. One obstacle is that mobile applications are relatively small in size. This makes it difficult to inject a urea solution into exhaust upstream of an SCR catalyst and decompose and hydrolyze the urea solution completely to ammonia prior to the exhaust arriving at the SCR catalyst (and achieve a high enough ratio of ammonia to $NO_x$). At low diesel engine exhaust temperatures and high gas flow velocities (e.g., about 20 meters per second), a distance of several meters (i.e., a time of 0.1 to 0.3 seconds) between the injector and the SCR catalyst is required for the aqueous urea solution spray to vaporize, for urea to decompose and hydrolyze into ammonia and carbon dioxide, and for the ammonia to become practical uniformly distributed across the flow front before entering the catalyst. Although various solutions to this problem have been suggested, (see, e.g., U.S. Pat. Nos. 6,928,807; 6,361,754; and 6,203,770; and U.S. published application No. 2006/0115402), these solutions involve generating ammonia outside of the SCR system and introducing the ammonia directly into the exhaust stream. In these systems, if the SCR catalyst is not pre-heated prior to introduction of this ammonia, the ammonia will pass through the SCR catalyst and foul the air. Therefore, there is a need for improved SCR systems that are suitable for mobile applications.

SUMMARY

Disclosed are apparatuses, systems, and methods for treating exhaust. The disclosed apparatuses, systems, and methods typically include or utilize a catalytic device for converting an aqueous urea solution to ammonia.

The disclosed apparatuses and systems for treating exhaust may include a housing having an upstream inlet for receiving the exhaust, and a downstream outlet for discharging the exhaust, where the housing defines an axial flow path for the exhaust. The disclosed apparatuses and systems further may include an injector configured to inject a urea solution into the exhaust. The disclosed apparatuses and systems typically include a catalytic device for converting urea to ammonia, which is positioned in the axial flow path downstream of the injector (e.g., a permeable catalytic device). The catalytic device has an upstream face that is positioned at an angle relative to the axial flow path (e.g., at an angle of about 20-70 degrees relative to the axial flow path, preferably at an angle of about 30-50 degrees relative to the axial flow path). The catalytic device typically is configured to receive the urea solution from the injector at the upstream face. The disclosed apparatuses and systems further may include a selective catalytic reactor (SCR) for converting $NO_x$ to nitrogen gas and water in the presence of ammonia, where the SCR is positioned downstream of the disclosed catalytic device.

Also disclosed are methods of manufacturing the disclosed apparatuses and systems. The methods may include methods for manufacturing an apparatus for treating exhaust. The methods may include: (a) providing a housing having an upstream inlet for receiving the exhaust, and a downstream outlet for discharging the exhaust, where the housing defines an axial flow path for the exhaust; (b) positioning in the housing an injector for injecting a urea solution into the exhaust; and (c) positioning downstream of the injector a catalytic device for converting urea to ammonia. Typically, the catalytic device has an upstream face that is positioned at an angle relative to the axial flow path (e.g., at an angle of about 20-70 degrees relative to the flow path, or preferably at an angle of about 30-50 degrees relative to the flow path). Typically, the catalytic device is configured to receive the urea solution from the injector at the upstream face. Optionally, the methods may include: (d) positioning downstream of the catalytic device a selective catalytic reactor for converting $NO_x$ to nitrogen gas and water in the presence of ammonia.

The disclosed methods may include methods for manufacturing a permeable catalytic device for converting urea to ammonia, where the device includes a pyrolysis catalyst, a hydrolysis catalyst, or both. The method for manufacturing the device may include: (a) manufacturing a first portion of the device, where the first portion includes the pyrolysis catalyst and has an upstream face and a downstream face; (b) manufacturing a second portion of the device, where the second portion includes the hydrolysis catalyst and has an upstream face and a downstream face; and (c) positioning the downstream face of the first portion adjacent to the upstream face of the second portion, thereby manufacturing the device; where the manufactured device is parallelogram-shaped in cross-section or trapezoid-shaped in cross-section. Optionally, the method for manufacturing the device further may include coupling the first portion and the second portion.

Also disclosed are methods of treating exhaust that utilize the disclosed apparatuses and systems. In some embodiments, the methods include passing exhaust through the disclosed catalytic devices, where the devices comprise a pyrolysis catalyst, a hydrolysis catalyst, or both. The exhaust may passively heat the catalytic device and promotes conversion of aqueous urea to ammonia, where aqueous urea is injected into the exhaust flow and deposited on an upstream face of the catalytic device.

The disclosed apparatuses and systems utilize a catalyst device for converting urea to ammonia. In some embodiments, the required distance between the injector and the catalytic device in a SCR system for achieving complete conversion of urea to ammonia is reduced by utilizing the disclosed catalytic device. The disclosed SCR systems may be suitable for mobile applications.

DETAILED DESCRIPTION

Disclosed are apparatuses, systems, and methods for treating exhaust. The disclosed apparatuses, systems, and methods typically include or utilize a catalytic device for converting an aqueous urea solution to ammonia. The catalytic device may include a pyrolysis catalyst, a hydrolysis catalyst, or both. The catalytic device typically has an upstream face that is positioned at an angle relative to an axial exhaust flow when the device is positioned in an SCR system. The upstream face typically is positioned to receive an aqueous urea solution that is injected from a nozzle of a urea tank.

The disclosed apparatuses and systems typically include a catalytic device having an upstream face that is positioned at an angle relative to an axial flow path. The disclosed apparatuses and systems may include a catalytic device having a downstream face that is positioned at a right angle relative to an axial flow path or at an angle of 90 degrees (±15 degrees) relative to the axial flow path, for example, if flow distribution uniformity is not a concern and the same length of exhaust gas pathlines is not required. In some embodiments, the disclosed apparatuses and systems may include a catalytic device having a downstream face that is positioned at an angle of about 20-70 degrees relative to the axial flow path, or at an angle of about 30-50 degrees relative to the axial flow path). In further embodiments, the upstream face and the downstream face of the catalytic device are positioned at about the same angle relative to the axial flow path. Because the catalytic device has an upstream face that is positioned at an angle relative to the axial flow path, the catalytic device typically is not square-shaped or rectangular-shaped in cross-section. In some embodiments, the catalytic device is trapezoid-shaped in cross-section or parallelogram-shaped in cross-section.

In the disclosed apparatuses and systems, the injector may be positioned at an angle that is not parallel or perpendicular to the axial flow path. In some embodiments, the injector is positioned at an angle of about 20-70 degrees relative to the axial flow path (preferably at an angle of about 30-50 degrees relative to the axial flow path). In further embodiments, the injector may be positioned at an angle of about 90 degrees (±15 degrees) relative to the upstream face of the catalytic device.

The catalytic device catalyzes the conversion of aqueous urea to ammonia. The catalytic device may include a pyrolysis catalyst, a hydrolysis catalyst, or both (preferably both). The device may be monolithic (i.e., composed of single piece of material), or segmented (i.e., composed of two or more separate pieces of material which optionally are coupled together). In some embodiments, the catalytic device is composed of a pyrolysis catalyst and is coated with a hydrolysis catalyst.

The catalytic device may include an upstream portion and a downstream portion, where the upstream portion includes a pyrolysis catalyst and the downstream portion includes a hydrolysis catalyst. The upstream portion and the downstream portion may be separate portions that are placed adjacently and optionally may be coupled. In some embodiments, the upstream portion and the downstream portion are separate portions that are parallelogram-shaped in cross-section. In further embodiments, the upstream portion and the downstream portion are separate portions that are triangular-shaped in cross-section, trapezoid-shaped in cross-section, square-shaped in cross-section, or rectangle-shaped in cross-section and are placed adjacently to provide a catalytic device that is trapezoid-shaped in cross-section or parallelogram-shaped in cross-section.

The catalytic device may comprise a material, including but not limited to: extruded material; wrapped material (e.g., pleated or corrugated material); and layered material. The catalytic device preferably comprises a material selected from a group consisting of extruded monolith material; composite ceramic material, (e.g., as in U.S. Pat. Nos. 6,582,490; and 6,444,006, which are incorporated by reference herein in their entireties); fibrous material; and metallic material, (e.g., flow-through metal foils and the like). Preferably, the catalytic device is permeable or porous. In the disclosed apparatuses and systems, the catalytic device may be heated by exhaust (e.g., passively to a temperature of at least about 200° C. or about 200-700° C. or about 200-300° C.) or by a heat source (e.g., actively by an electronic heat source) to accelerate evaporation and decomposition and enhance hydrolysis or urea to ammonia.

The catalytic devices may include a pyrolysis catalyst, a hydrolysis catalyst, or both (preferably both) for converting urea to ammonia. The catalytic device may be manufactured from material that functions as a pyrolysis catalyst, a hydrolysis catalyst, or both. In some embodiments, the catalytic device is coated with a material that functions as a pyrolysis catalyst, a hydrolysis catalyst, or both.

The pyrolysis catalyst comprises a material that catalyzes the conversion of urea to ammonia (or to isocyanic acid) in the presence of heat (e.g., at a temperature of at least about 200° C.). Suitable pyrolysis catalysts may include, but are not limited to, materials having a relative high heat capacity such as metals or metal alloys. Suitable metals and metal alloys may include, but are not limited to iron or iron alloys (e.g., stainless steel), aluminum or aluminum alloys, and copper or copper alloys. In some embodiments, a pyrolysis catalyst may be coated with a different pyrolysis catalyst or a hydrolysis catalyst. The hydrolysis catalyst comprises a material that catalyzes the conversion of urea to ammonia in the presence of water (or the conversion of isocyanic acid to ammonia in the presence of water). Suitable hydrolysis catalysts may include, but are not limited to, metals and metal oxides (e.g., transition metals or transition metal oxides such as titanium, palladium, platinum, vanadium, chromium, molybdenum, nickel, or oxides thereof).

The disclosed apparatuses and systems typically include a catalytic device for converting aqueous urea to ammonia. The disclosed apparatuses and systems also may include a SCR catalyst. The SCR catalyst comprises, or is coated or impregnated with, a material that catalyzes the conversion of $NO_x$ to nitrogen gas and water. SCR catalysts may include, but are not limited to, activated carbon, charcoal or coke, zeolites, vanadium oxide, tungsten oxide, titanium oxide, iron oxide, copper oxide, manganese oxide, chromium oxide, noble metals such as platinum group metals like platinum, palladium, rhodium, and iridium, and combinations thereof.

The catalysts disclosed herein, including the pyrolysis catalysts, hydrolysis catalysts, and SCR catalysts may comprise a support material or may be mounted on a support material. Support material may include, but is not limited to, ceramic substances, zeolites, homogeneous monolith materials, and metals and metal alloys. The disclosed catalytic devices may be utilized in SCR exhaust aftertreatment systems. SCR systems are disclosed in U.S. Pat. Nos. 6,449,947; 6,601,385; 6,722,123; and 7,328,572, the contents of which are incorporated herein in their entireties.

Figure 1:
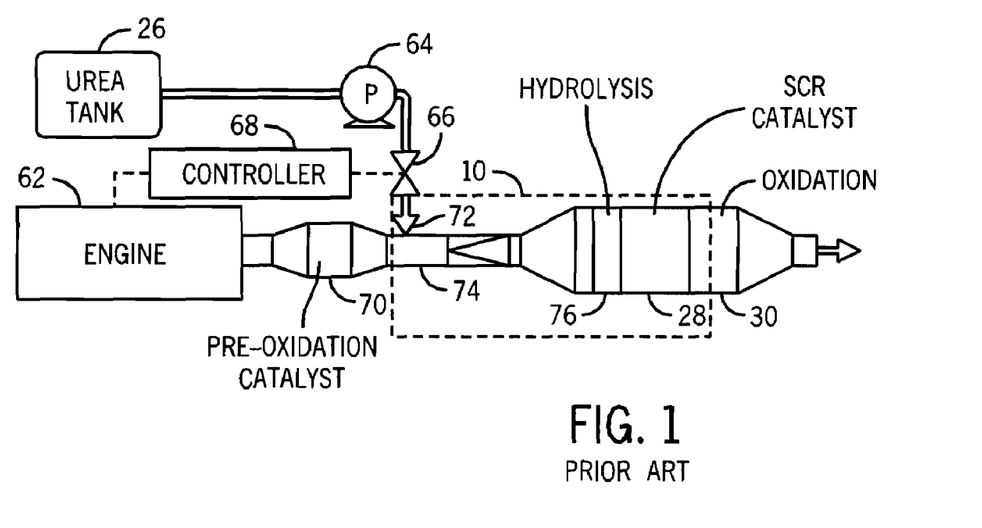
FIG. 1 shows an SCR system for exhaust of the prior art.

Referring now to the drawings, FIG. 1 shows an SCR system for exhaust of the prior art. Exhaust is emitted from engine 62. Pump 64 draws aqueous urea solution from tank 26 and supplies same through valve 66 which is controlled by controller 68 which in turn is controlled by the engine. Engine exhaust is initially supplied through pre-oxidation catalyst 70 and then mixed with the aqueous urea solution injected at 72 into exhaust pipe 74. The mixture then flows downstream to hydrolysis catalyst 76, SCR catalyst 28 and oxidation catalyst 30. Housing 10 has a given cross-sectional area at SCR catalyst 28 transverse to axial flow 48 of exhaust.

Figure 2:
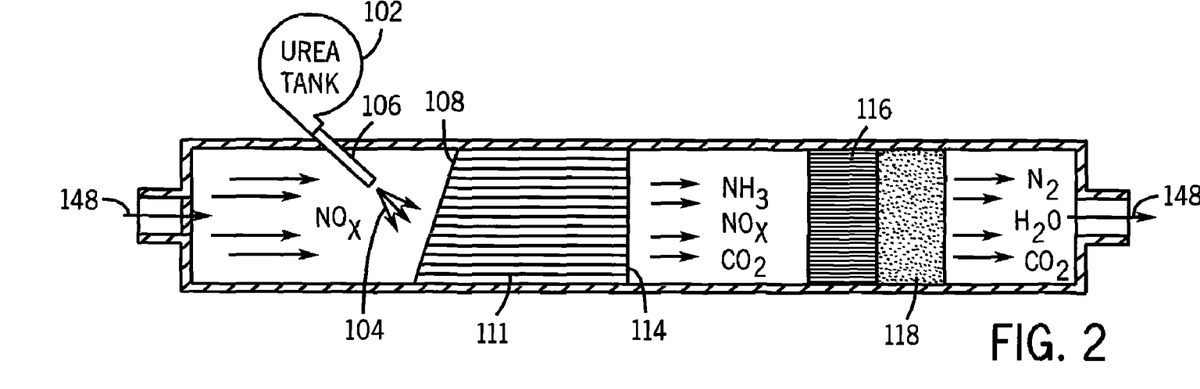
FIG. 2 is a sectional view of one embodiment of an SCR system as disclosed herein.

FIG. 2 is a sectional view of one embodiment of an SCR system as disclosed herein. Exhaust enters the system along an axial flow path 148. A urea tank 102 injects an aqueous urea solution 104 through an injector 106. The aqueous urea solution is deposited on the upstream face 108 of a permeable catalytic device 111 that is trapezoid-shaped. The catalytic device comprises a pyrolysis catalyst and a hydrolysis catalyst. Exhaust heats the catalytic device and the aqueous urea solution is evaporated and heated to catalyze the conversion of urea to ammonia (or isocyanic acid, which is subsequently converted to ammonia). The exhaust exits the catalytic device at a downstream face 114. The exhaust passes through an SCR catalyst 116 and an exhaust catalyst 118 prior to exiting the system.

Figure 3:
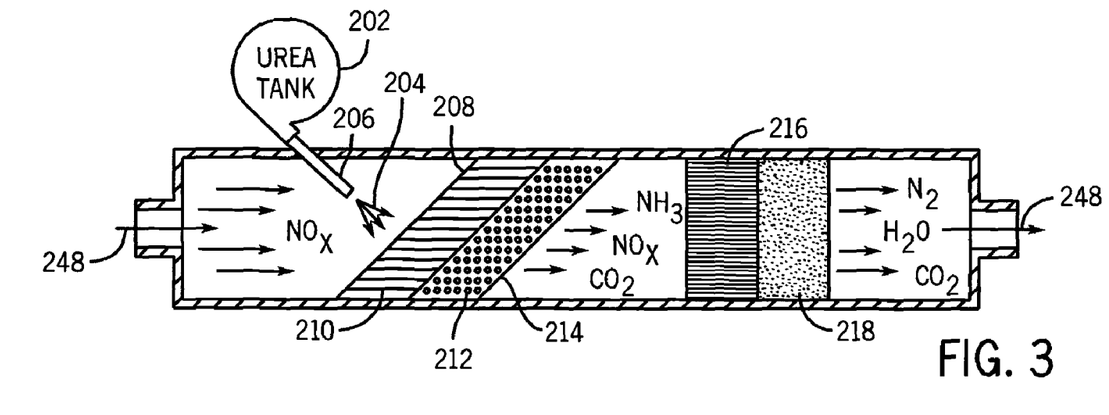
FIG. 3 is a sectional view of another embodiment of an SCR system as disclosed herein.
Figure 4A:
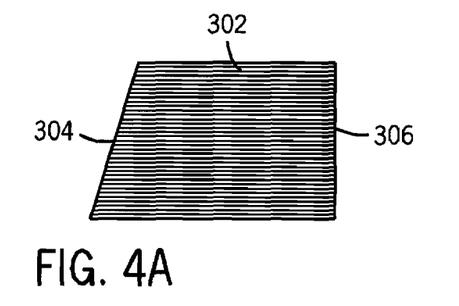
FIG. 4 provides sectional views of four embodiments (A, B, C, and D) of a catalytic device as disclosed herein.
Figure 4B:
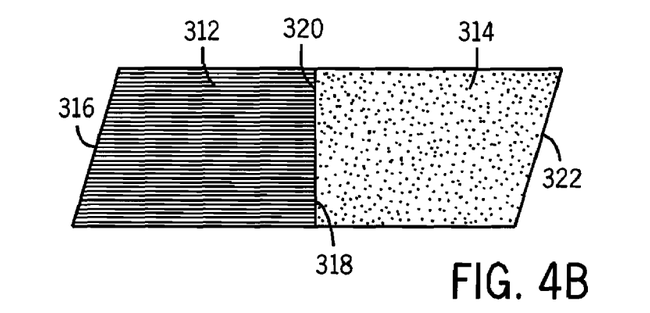
Figure 4C:
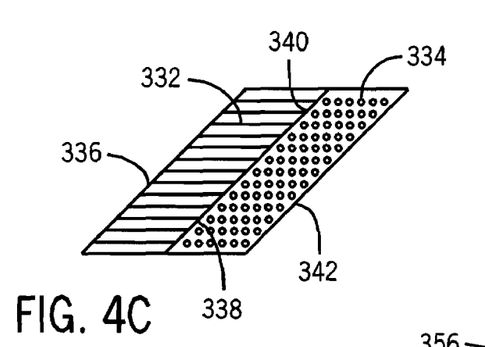
Figure 4D:
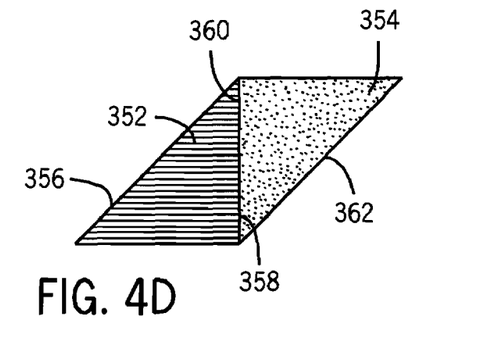

FIG. 3 is a sectional view of another embodiment of an SCR system as disclosed herein. Exhaust enters the system along an axial flow path 248. A urea tank 202 injects an aqueous urea solution 204 through an injector 206. The aqueous urea solution is deposited on the upstream face 208 of a catalytic device that comprises a permeable pyrolysis catalyst 210 and a permeable hydrolysis catalyst 212. Exhaust heats the pyrolysis catalyst and the aqueous urea solution is evaporated and heated to catalyze the conversion of urea to ammonia (or isocyanic acid, which is subsequently converted to ammonia). The exhaust passes through the pyrolysis catalyst 210 to the hydrolysis catalyst 212. The hydrolysis catalyst comprises, or is coated or impregnated with, an agent that catalyzes the hydrolysis of urea (or isocyanic acid) to ammonia. The exhaust exits the hydrolysis catalyst at a downstream face 214. The exhaust passes through an SCR catalyst 216 and an exhaust catalyst 218 prior to exiting the system.

FIG. 4 provides sectional views of three embodiments (A, B, C, and D) of a catalytic device as disclosed herein. In FIG. 4A, the catalytic device 302 is monolithic and trapezoid-shaped in cross-section. The device includes an upstream face 304 configured for receiving an aqueous solution of urea and configured to receive exhaust when the device is placed in an SCR system. The device includes a downstream face 306 that is configured such that exhaust exits the downstream face when the device is placed in an SCR system. FIG. 4B illustrates a catalytic device that is parallelogram-shaped in cross-section and includes a separate pyrolysis catalyst 312 that is trapezoid-shaped in cross-section and a separate hydrolysis catalyst 314 that is trapezoid-shaped in cross-section. The pyrolysis catalyst 312 and the hydrolysis catalyst 314 are positioned adjacently where a downstream face 318 of the pyrolysis catalyst is adjacent to an upstream face 320 of the hydrolysis catalyst to form the catalytic device. When the device is placed in an SCR system, the upstream face of the pyrolysis catalyst 316 is configured to receive an aqueous solution of urea and is configured to receive exhaust. When the device is place in an SCR system, the downstream face of the hydrolysis catalyst 322 is configured such that exhaust exits the downstream face. FIG. 4C illustrates a catalytic device that is parallelogram-shaped in cross-section and includes a separate pyrolysis catalyst 332 that is parallelogram-shaped in cross-section and a separate hydrolysis catalyst 334 that is parallelogram-shaped in cross-section. The pyrolysis catalyst 332 and the hydrolysis catalyst 334 are positioned adjacently where a downstream face 338 of the pyrolysis catalyst is adjacent to an upstream face 340 of the hydrolysis catalyst to form the catalytic device. When the device is placed in an SCR system, the upstream face of the pyrolysis catalyst 336 is configured to receive an aqueous solution of urea and is configured to receive exhaust. When the device is place in an SCR system, the downstream face of the hydrolysis catalyst 342 is configured such that exhaust exits the downstream face. FIG. 4D illustrates a catalytic device that is parallelogram-shaped in cross-section and includes a separate pyrolysis catalyst 352 that is triangle-shaped in cross-section and a separate hydrolysis catalyst 354 that is triangle-shaped in cross-section. The pyrolysis catalyst 352 and the hydrolysis catalyst 354 are positioned adjacently where a downstream face 358 of the pyrolysis catalyst is adjacent to an upstream face 360 of the hydrolysis catalyst to form the catalytic device. When the device is placed in an SCR system, the upstream face of the pyrolysis catalyst 356 is configured to receive an aqueous solution of urea and is configured to receive exhaust. When the device is place in an SCR system, the downstream face of the hydrolysis catalyst 362 is configured such that exhaust exits the downstream face.

Figure 5:
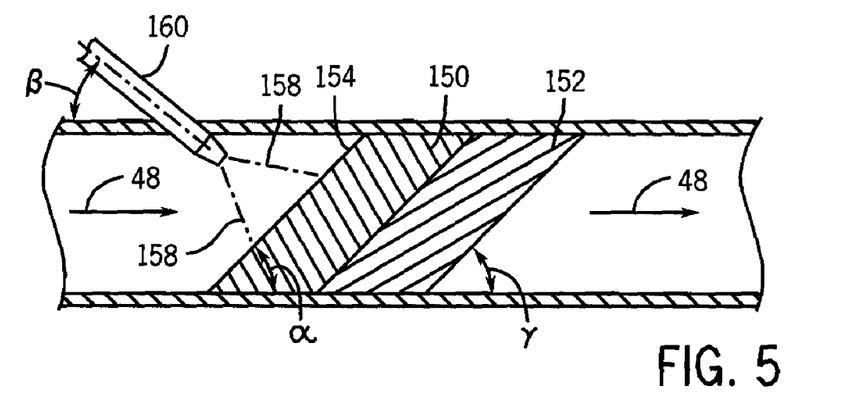
FIG. 5 provides a sectional view of a portion of one embodiment of an SCR system as disclosed herein.

FIG. 5 provides a sectional view of a portion of one embodiment of an SCR system as disclosed herein. Exhaust enters and exits the system along an axial flow path 48. The system includes a catalytic device comprising a pyrolysis catalyst 150 having an upstream face 154 and a hydrolysis catalyst 154 having a downstream face 156. The pyrolysis catalyst 150 and the hydrolysis catalyst are parallelogram-shaped in cross-section. The upstream face of the pyrolysis catalyst is positioned at angle α relative to the axial flow, (where α is an angle of about 20-70 degrees, and preferably about 30-50 degrees). An aqueous urea solution is introduced into the system through an injector 160. The injector is positioned at angle β relative to the axial flow, (where β is an angle of about 20-70 degrees, and preferably about 30-50 degrees). The aqueous urea solution is deposited on the upstream face 154 of the pyrolysis catalyst 154. The exhaust passes through the pyrolysis catalyst and enters the hydrolysis catalyst, exiting the hydrolysis catalyst at the downstream face 156. The downstream face 156 of the hydrolysis catalyst is positioned at angle γ relative to the axial flow, (where γ is an angle of about 20-70 degrees, and preferably about 30-50 degrees). Angles α and γ may be the same or different. Where angles α and γ are the same, the catalytic device may be parallelogram-shaped in cross-section.

Figure 6:
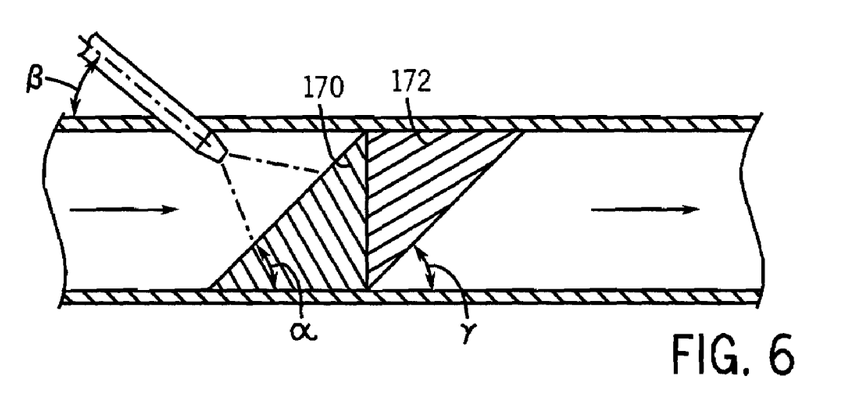
FIG. 6 provides a sectional view of a portion of another embodiment of an SCR system as disclosed herein.

FIG. 6 provides a sectional view of a portion of another embodiment of an SCR system as disclosed herein. The SCR system of FIG. 6 is configured similarly to the SCR system of FIG. 5. However, in FIG. 6, the pyrolysis catalyst 170 and the hydrolysis catalyst 172 are triangle-shaped in cross-section.

Figure 7:
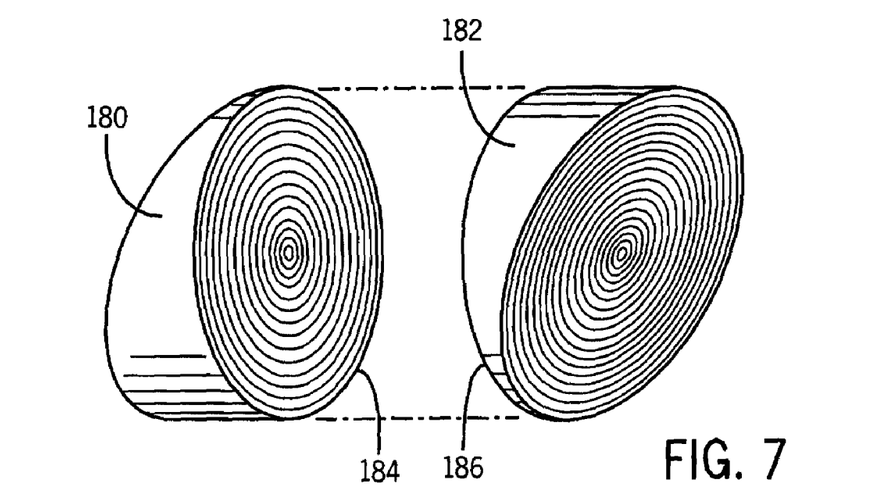
FIG. 7 provides a perspective view of one embodiment of a catalytic device as disclosed herein.

FIG. 7 provides a perspective view of one embodiment of a catalytic device as disclosed herein. In FIG. 6, the pyrolysis catalyst 180 and the hydrolysis catalyst 182 have a tubular shape from a side view and may be formed by cutting a tubular-shaped material traversely at an angle. The pyrolysis catalyst 180 and the hydrolysis catalyst 182 may be positioned adjacently to form the catalytic device, where the downstream face of the pyrolysis catalyst 184 is positioned adjacent to the upstream face of the hydrolysis catalyst 186. The catalytic device thus formed may have a tubular shape and angled upstream and downstream faces.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible.

What is claimed is:

1. An apparatus for treating exhaust comprising:
   (a) a housing having an upstream inlet for receiving the exhaust, and a downstream outlet for discharging the exhaust, the housing defining an axial flow path for the exhaust;
   (b) an injector configured to inject a urea solution into the exhaust;
   (c) a permeable catalytic device for converting urea to ammonia positioned in the axial flow path downstream of the injector, wherein the catalytic device has an upstream face that is positioned at an angle of about 20-70 degrees relative to the axial flow path and the catalytic device is configured to receive the urea solution from the injector at the upstream face; and
   (d) a selective catalytic reactor for converting $NO_x$ to nitrogen gas and water in the presence of ammonia, wherein the selective catalytic reactor is positioned downstream of the catalytic device;
   wherein the catalytic device is parallelogram-shaped in cross-section or trapezoid-shaped in cross-section.

2. The apparatus of claim 1, wherein the upstream face is positioned at an angle of about 30-50 degrees relative to the axial flow path.

3. The apparatus of claim 1, wherein the catalytic device has a downstream face that is positioned at a right angle relative to the axial flow path.

4. The apparatus of claim 1, wherein the catalytic device is trapezoid-shaped in cross-section.

5. The apparatus of claim 1, wherein the injector is positioned at an angle of about 20-70 degrees relative to the axial flow path.

6. The apparatus of claim 1, wherein the injector is positioned at an angle of about 90±15 degrees relative to the upstream face of the catalytic device.

7. The apparatus of claim 1, wherein the catalytic device comprises a pyrolysis catalyst.

8. The apparatus of claim 1, wherein the catalytic device comprises a hydrolysis catalyst.

9. The apparatus of claim 1, wherein the catalytic device comprises a pyrolysis catalyst and a hydrolysis catalyst.

10. The apparatus of claim 1, wherein the catalytic device comprises an upstream portion and a downstream portion, and the upstream portion comprises a pyrolysis catalyst and the downstream portion comprises a hydrolysis catalyst.

11. The apparatus of claim 10, wherein the upstream portion and the downstream portion are separate.

12. A method for treating exhaust comprising passing exhaust through the apparatus of claim 1.

13. A method of manufacturing an apparatus for treating exhaust comprising:
   (a) providing a housing having an upstream inlet for receiving the exhaust, and a downstream outlet for discharging the exhaust, the housing defining an axial flow path for the exhaust;
   (b) positioning in the housing an injector for injecting a urea solution into the exhaust; and
   (c) positioning downstream of the injector a catalytic device for converting urea to ammonia, the catalytic device having an upstream face that is positioned at an angle of about 20-70 degrees relative to the axial flow path, and the catalytic device configured to receive the urea solution from the injector at the upstream face;
   wherein the catalytic device is parallelogram-shaped in cross-section or trapezoid-shaped in cross-section.

14. The method of claim 13, further comprising:
   (d) positioning downstream of the catalytic device a selective catalytic reactor for converting $NO_x$ to nitrogen gas and water in the presence of ammonia.

15. A permeable catalytic device for converting urea to ammonia comprising a separate first portion and a separate second portion, and the first portion comprises a pyrolysis catalyst and the second portion comprises a hydrolysis catalyst, wherein the first portion and the second portion are positioned adjacent to each other to form the catalytic device, and the catalytic device is one of parallelogram-shaped in cross-section and trapezoid-shaped in cross-section.

16. An apparatus for treating exhaust comprising:
   (a) a housing having an upstream inlet for receiving the exhaust, and a downstream outlet for discharging the exhaust, the housing defining an axial flow path for the exhaust;
   (b) an injector configured to inject a urea solution into the exhaust;
   (c) the catalytic device of claim 15 positioned downstream of the injector; and
   (d) a selective catalytic reactor for converting $NO_x$ to nitrogen gas and water in the presence of ammonia, the selective catalytic reactor positioned downstream of the catalytic device for converting urea to ammonia.

17. A method of manufacturing a permeable catalytic device for converting urea to ammonia, the device comprising a pyrolysis catalyst and a hydrolysis catalyst, the method comprising:
(a) manufacturing a first portion of the device, wherein the first portion comprises the pyrolysis catalyst and has an upstream face and a downstream face;
(b) manufacturing a second portion of the device, wherein the second portion comprises the hydrolysis catalyst and has an upstream face and a downstream face; and
(c) positioning the downstream face of the first portion adjacent to the upstream face of the second portion, thereby forming the device;
wherein the manufactured device is parallelogram-shaped in cross-section or trapezoid-shaped in cross-section.

18. The method of claim 17, further comprising coupling the first portion and the second portion.

* * * * *